US008233181B2

(12) United States Patent
Abraitis et al.

(10) Patent No.: US 8,233,181 B2
(45) Date of Patent: *Jul. 31, 2012

(54) SYSTEM AND METHOD FOR PROCESSING A FORM

(75) Inventors: John Abraitis, Cumberland, RI (US);
Steve Bozzi, Narragansett, RI (US);
Chris Collins, Lincoln, RI (US);
Richard Sean Meehan, S. Kingstown, RI (US); Frank Metayer, West Warwick, RI (US)

(73) Assignee: GTECH Rhode Island Corporation, Providence, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/026,712

(22) Filed: Feb. 14, 2011

(65) Prior Publication Data

US 2011/0176180 A1 Jul. 21, 2011

Related U.S. Application Data

(63) Continuation of application No. 11/376,052, filed on Mar. 14, 2006, now Pat. No. 7,920,299.

(60) Provisional application No. 60/661,698, filed on Mar. 14, 2005.

(51) Int. Cl.
*G06F 3/12* (2006.01)

(52) U.S. Cl. ....... 358/1.15; 358/474; 358/471; 358/482; 382/232; 382/217; 235/375; 235/454

(58) Field of Classification Search .................. 358/474, 358/471, 488, 482, 1.15; 235/454, 462.13, 235/487, 486, 449; 382/232, 209, 217, 218, 382/100
See application file for complete search history.

(56) References Cited

U.S. PATENT DOCUMENTS

| 4,141,036 A * | 2/1979 | Diehl ............................ 348/277 |
| 4,240,748 A | 12/1980 | Blanc et al. |
| 4,724,307 A | 2/1988 | Dutton et al. |
| 4,736,109 A | 4/1988 | Dvorzsak |
| 4,760,247 A | 7/1988 | Keane et al. |
| 5,039,847 A | 8/1991 | Morii et al. |
| 5,216,595 A | 6/1993 | Protheroe |
| 5,239,165 A | 8/1993 | Novak |

(Continued)

FOREIGN PATENT DOCUMENTS

EP 0910032 A2 4/1999

(Continued)

OTHER PUBLICATIONS

Boone, J.M. et al., "Analysis and Correction of Imperfections in the Image Intensifier-TV-Digitizer Imaging Chain," *Medical Physics*, vol. 18, No. 2, Mar./Apr 1991, pp. 236-242.

(Continued)

*Primary Examiner* — Negussie Worku
(74) *Attorney, Agent, or Firm* — McCarter & English, LLP; Kia L. Freeman, Esq.

(57) ABSTRACT

In a system and method for processing a form comprising a plurality of entry markings, an area-array image sensor may capture an image of the form in free-space without requiring relative movement of the sensor and the form. A processor may interpret the captured image to determine at least a first entry selection based, at least in part, on the position of at least one of the plurality of entry markings with respect to at least one other marking in the image.

27 Claims, 4 Drawing Sheets

U.S. PATENT DOCUMENTS

| | | | |
|---|---|---|---|
| 5,262,624 A | | 11/1993 | Koch |
| 5,362,105 A * | | 11/1994 | Scott .................. 283/65 |
| 5,417,424 A | | 5/1995 | Snowden et al. |
| 5,452,379 A | | 9/1995 | Poor |
| 5,673,125 A | | 9/1997 | Merecki et al. |
| 5,689,104 A | | 11/1997 | Suzuki et al. |
| 5,734,153 A | | 3/1998 | Swartz et al. |
| 5,748,783 A * | | 5/1998 | Rhoads .................. 382/232 |
| 5,818,026 A | | 10/1998 | Melling et al. |
| 5,821,518 A | | 10/1998 | Sussmeier et al. |
| 5,834,749 A | | 11/1998 | Durbin |
| 5,945,655 A | | 8/1999 | Gilgeous et al. |
| 6,150,930 A | | 11/2000 | Cooper |
| 6,157,435 A | | 12/2000 | Slater et al. |
| 6,176,429 B1 | | 1/2001 | Reddersen et al. |
| 6,199,044 B1 | | 3/2001 | Ackley et al. |
| 6,223,986 B1 | | 5/2001 | Bobba et al. |
| 6,234,899 B1 | | 5/2001 | Nulph |
| 6,262,670 B1 | | 7/2001 | Ballou |
| 6,340,114 B1 | | 1/2002 | Correa et al. |
| 6,357,658 B1 | | 3/2002 | Garczynski et al. |
| 6,366,696 B1 | | 4/2002 | Hertz et al. |
| 6,494,372 B2 | | 12/2002 | Bruchlos et al. |
| 6,553,129 B1 * | | 4/2003 | Rhoads .................. 382/100 |
| 6,650,427 B2 | | 11/2003 | Brooks et al. |
| 6,722,569 B2 | | 4/2004 | Ehrhart et al. |
| 6,736,319 B2 | | 5/2004 | Swanson et al. |
| 6,760,476 B2 | | 7/2004 | Meder |
| 6,776,337 B2 | | 8/2004 | Irwin, Jr. et al. |
| 6,875,015 B1 | | 4/2005 | Tiernan |
| 6,875,105 B1 | | 4/2005 | Behm et al. |
| 6,887,153 B2 | | 5/2005 | Walker et al. |
| 6,954,290 B1 | | 10/2005 | Braudaway et al. |
| 7,060,968 B1 * | | 6/2006 | Leviton .................. 250/231.13 |
| 7,090,131 B2 | | 8/2006 | Natsuno |
| 7,124,945 B2 | | 10/2006 | Kim |
| 7,221,487 B2 * | | 5/2007 | Sesek et al. .................. 358/488 |
| 7,247,095 B2 | | 7/2007 | Nulph |
| 7,474,760 B2 * | | 1/2009 | Hertzman et al. .................. 382/100 |
| 7,635,088 B2 | | 12/2009 | Chung et al. |
| 7,674,171 B2 * | | 3/2010 | Walker et al. .................. 463/17 |
| 7,688,467 B2 * | | 3/2010 | Enmei .................. 358/1.15 |
| 7,764,408 B2 * | | 7/2010 | Ohama et al. .................. 358/488 |
| 2001/0025880 A1 | | 10/2001 | Bruchlos et al. |
| 2001/0029513 A1 | | 10/2001 | Kuwano et al. |
| 2002/0010022 A1 | | 1/2002 | Vincent |
| 2002/0048403 A1 | | 4/2002 | Guerreri |
| 2002/0109866 A1 | | 8/2002 | Yang et al. |
| 2003/0102376 A1 | | 6/2003 | Meier et al. |
| 2003/0173404 A1 | | 9/2003 | Chung et al. |
| 2003/0186734 A1 * | | 10/2003 | LeMay et al. .................. 463/16 |
| 2004/0029630 A1 * | | 2/2004 | Walker et al. .................. 463/17 |
| 2004/0106652 A1 | | 6/2004 | Hamilton et al. |
| 2004/0209665 A1 * | | 10/2004 | Walker et al. .................. 463/17 |
| 2004/0218835 A1 | | 11/2004 | Loew |
| 2005/0098633 A1 | | 5/2005 | Poloniewicz et al. |
| 2005/0161511 A1 | | 7/2005 | Parker et al. |
| 2005/0233797 A1 | | 10/2005 | Gilmore et al. |
| 2005/0237580 A1 * | | 10/2005 | Coleman et al. .................. 358/462 |
| 2005/0238260 A1 | | 10/2005 | Coleman et al. |
| 2006/0063589 A1 | | 3/2006 | Chong |
| 2006/0079311 A1 | | 4/2006 | Nulph |
| 2006/0122910 A1 | | 6/2006 | Chau et al. |
| 2006/0152595 A1 | | 7/2006 | Ryu et al. |
| 2006/0221354 A1 | | 10/2006 | Slaten et al. |
| 2006/0255145 A1 | | 11/2006 | Chung et al. |
| 2006/0290886 A1 | | 12/2006 | Santos |
| 2007/0109511 A1 | | 5/2007 | Kelly et al. |
| 2008/0240614 A1 | 10/2008 | Garcia |
| 2009/0020606 A1 | 1/2009 | Chung et al. |
| 2009/0167960 A1 | 7/2009 | Miyasato |
| 2010/0060943 A1 | 3/2010 | Monga et al. |

FOREIGN PATENT DOCUMENTS

| | | |
|---|---|---|
| EP | 1 172 756 A1 | 1/2002 |
| EP | 1 441 315 A1 | 7/2004 |
| JP | 05-242279 | 9/1993 |
| JP | 06-266876 | 9/1994 |
| JP | 07037018 | 2/1995 |
| JP | 07-105133 | 4/1995 |
| JP | 07-239920 | 9/1995 |
| JP | 11-220588 | 8/1999 |
| JP | 2000149081 A | 5/2000 |
| JP | 2002056348 A | 2/2002 |
| JP | 2004-219255 | 8/2004 |
| WO | WO 00/04487 A1 | 1/2000 |
| WO | WO 01/04571 A1 | 1/2001 |
| WO | WO 2007/114241 A1 | 10/2007 |

OTHER PUBLICATIONS

European Patent Application No. 09166997.8, filed Mar. 14, 2006: Search Report, dated Sep. 9, 2009 (8 pages).

European Patent No. 1 861 809: Notice of Opposition, dated Feb. 4, 2010, and Facts and Arguments in Support of Opposition (24 pages).

Fantozzi, S. et al., "A Global Method Based on Thin-plate Splines for Correction of Geometric Distortion: An Application to Fluoroscopic Images," *Medical Physics*, vol. 30, No. 2, Feb. 2003, pp. 124-131.

Glasbey, C.A. et al., "A Review of Image Warping Methods," *Journal of Applied Statistics*, vol. 25, No. 2, Apr. 1998, pp. 155-171.

International Patent Application No. PCT/US2006/009362: International Search Report and Written Opinion; Date of Mailing: Sep. 21, 2006 (16 pages).

International Patent Application No. PCT/US2009/057610: International Search Report and Written Opinion; Date of Mailing: May 19, 2010.

International Patent Application No. PCT/US2009/058018: International Search Report and Written Opinion; Date of Mailing: Jan. 25, 2010.

International Patent Application No. PCT/US2009/065660: International Search Report and Written Opinion; Date of Mailing: Mar. 8, 2010.

U.S. Appl. No. 12/236,843, filed Sep. 24, 2008: Office Action, dated Nov. 22, 2010.

European Patent Office, Summons to Attend Oral Proceedings in European Patent No. 1861809 with Annex Including Provisional Opinion, dated Jul. 20, 2011, 11 pages.

Gtech Rhode Island Corporation (Patent Proprietor), Written Submission in Response to Summons to Attend Oral Proceedings in European Patent No. 1861809 with Claims of Main Request and Auxilliary Requests 1-8, filed at European Patent Office, dated Oct. 7, 2011, 36 pages.

Olswang (Opponent), Written Submission in Response to Summons to Attend Oral Proceedings in European Patent No. 1861809, filed at European Patent Office, dated Oct. 7, 2011, 4 pages.

European Patent Office, Information About Result of Oral Proceedings in European Patent No. 1861809, dated Nov. 7, 2011, 1 page.

European Patent Office, Interlocutory Decision in Opposition Proceeding regarding European Patent No. 1861809, dated Dec. 15, 2011, 42 pages.

Office Action issued by the Japanese Patent Office in Japanese Application No. 2008-502010, dated Jan. 10, 2012 and English translation therefore.

* cited by examiner

SYSTEM AND METHOD FOR PROCESSING A FORM

CROSS REFERENCE TO RELATED APPLICATIONS

This application is a continuation of application Ser. No. 11/376,052, filed Mar. 14, 2006, now U.S. Pat. No. 7,920,299 which claims the benefit of priority of provisional Application No. 60/661,698, filed Mar. 14, 2005. application Ser. No. 11/376,052 is hereby incorporated by reference in its entirety.

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Image sensors are commonly used to obtain an image of an object, e.g., a physical document or a form, for processing markings of the object. For example, circuitry of the image sensor or in communication with the image sensor converts markings of the obtained image into data that can be machine-processed. Example forms of which an image is obtained for processing of markings in the image are lottery playslips. An example playslip is a card, ticket, or other printed media that indicates a player's lottery number selections. It may be used by the player to purchase a lottery ticket having the indicated player lottery number selections. Markings of the lottery playslips are processed, e.g., for determining numbers selected by a player for an upcoming lottery drawing.

It is conventional to use a linear image sensor to obtain the image for processing of markings of the image. For example a linear barcode scanner is used to obtain an image of a portion of a barcode, i.e., a representative line of the barcode. Individual sub-markings of the obtained line are converted into processable data in order for a processor to "read" the barcode. Barcode scanners are commonly used in lottery applications.

Where lines to be processed are not uniform, so that one line of markings is not representative of all other lines of markings, it is necessary for the linear image sensor to progressively obtain a plurality of images, for example, one image per line. To do so, it is conventional for a user to tediously pass a hand-held linear image sensor over the object until all of the lines of the marking are obtained by the linear image sensor. The use of such linear image sensors to obtain an image that includes a number of non-uniform lines of markings to be processed takes up much time and effort by the user.

It is also conventional for a linear image sensor to include a mechanical device either for passing the linear image sensor over the object or for passing the object by the linear image sensor. Such sensors are bulky, and the use of such linear image sensors takes up much time.

Furthermore, some forms include markings, the processing of which is in accordance with a position of the markings with respect to the form. To process such markings, it is conventional to provide a linear image sensor with an electro-mechanical device to precisely position the form in a predetermined position with respect to the linear image sensor and to pass the form so positioned over a readhead of the linear image sensor. Since the form is positioned in a predetermined manner, a processor can process markings of the form according to the location of the markings in the precisely positioned form. For example, some lottery tickets, e.g., lottery playslips often include geometric shapes to be filled in by a user, e.g. fill-in squares, circles, etc. Each filled-in shape is processed as a particular number based on a position of the mark with respect to the ticket. It is conventional for an electro-mechanical device to pass such playslips over a readhead of a linear image sensor in order to obtain an image of the playslip for processing of the fill-in markings, for example as number selections for a lottery drawing. However such electro-mechanical devices are expensive.

It is conventional to use an area-array image sensor to simultaneously obtain an image of numerous lines of a form, e.g., to simultaneously obtain all fill-in markings of a lottery playslip. However, an image of the same form sensed by the area-array sensor may vary depending on the form's position with respect to the area-array sensor. For example, for a particular sensing area sensed by the area-array sensor, the sensed image of the form consumes much or all of the sensing area when the form is positioned near the area-array sensor, and consumes less of the sensing area when the form is placed farther from the area-array sensor. Differences in the degree of tilt of the form with respect to the area-array sensor also result in differences in the image sensed by the area-array sensor. For example, if a top side of a rectangular form is tilted away from the area-array sensor, the sensor senses the form as though it is of a trapezoidal shape, such as that of the form image 100 illustrated in FIG. 1. Since a change in the form's position or degree of tilt produces a change in the image sensed by the area-array sensor and therefore distorts the processing of the markings of the form, it is conventional to provide a stand in which to place the form, e.g., the playslip during image capture, so that the playslip is positioned in a predetermined manner with respect to the area-array sensor. However, such stands take up space, e.g., counter space at a lottery terminal.

DETAILED DESCRIPTION OF EXAMPLE EMBODIMENTS

There is a need in the art for a system and method for processing markings of an image of a form sensed with an area-array sensor, without the use of a stand for positioning the form in a predetermined position with respect to the sensor. Some embodiments of the present invention generally relate to a system and method for obtaining an image of a form in order to process information in the form with an area-array image sensor, while the form is in free-space, e.g., without the use of a stand for precisely positioning the form with respect to the image sensor. The embodiments particularly, though not exclusively, relate to sensing an image of a lottery playslip for processing markings of the playslip as a lottery entry. Some of the embodiments provide for aiding a user to correctly position a form for input by aligning light patterns at indicated positions on the form.

Figure 1:
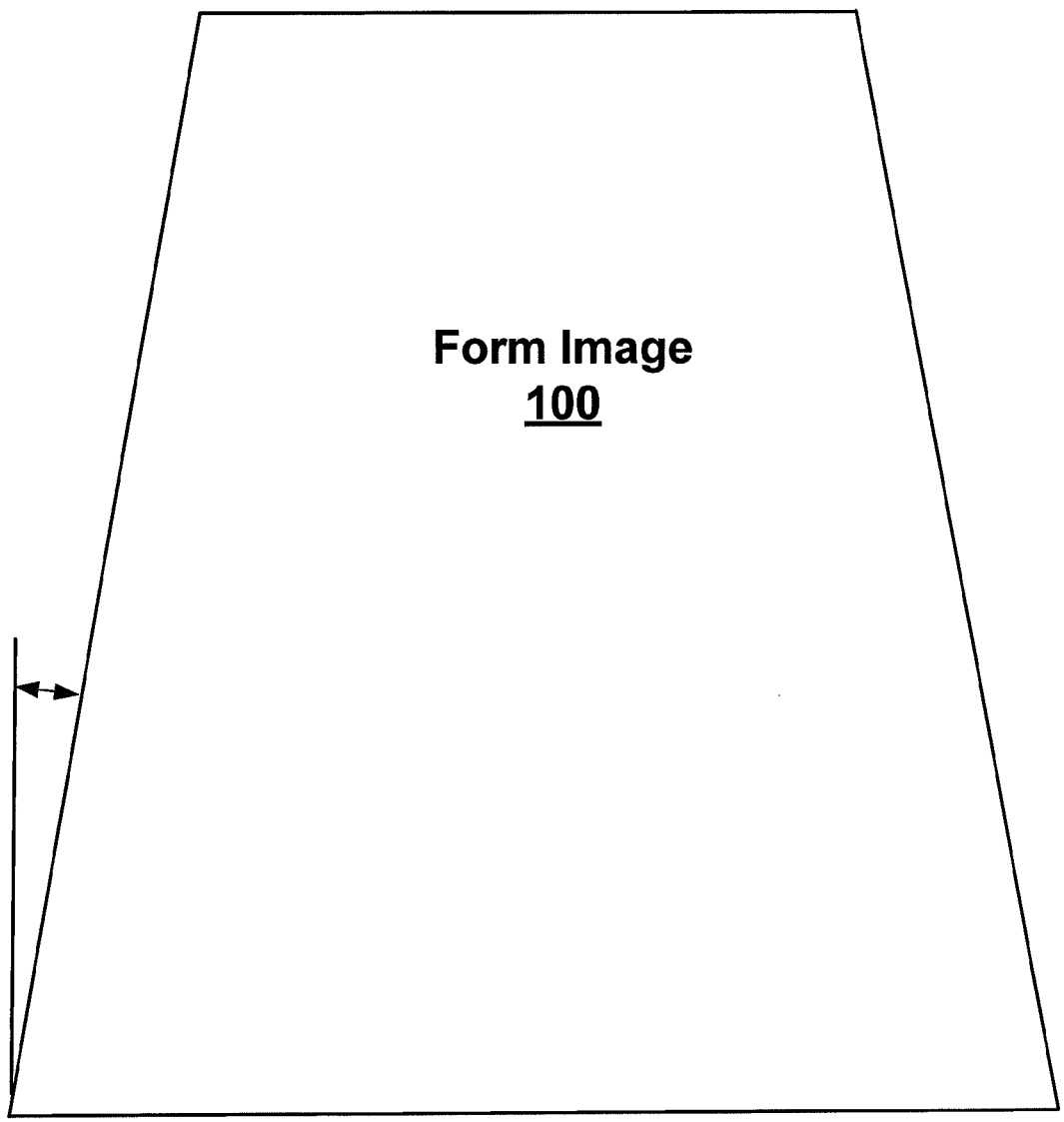
FIG. 1 is a diagram that illustrates an example of a tilted form.
Figure 2:
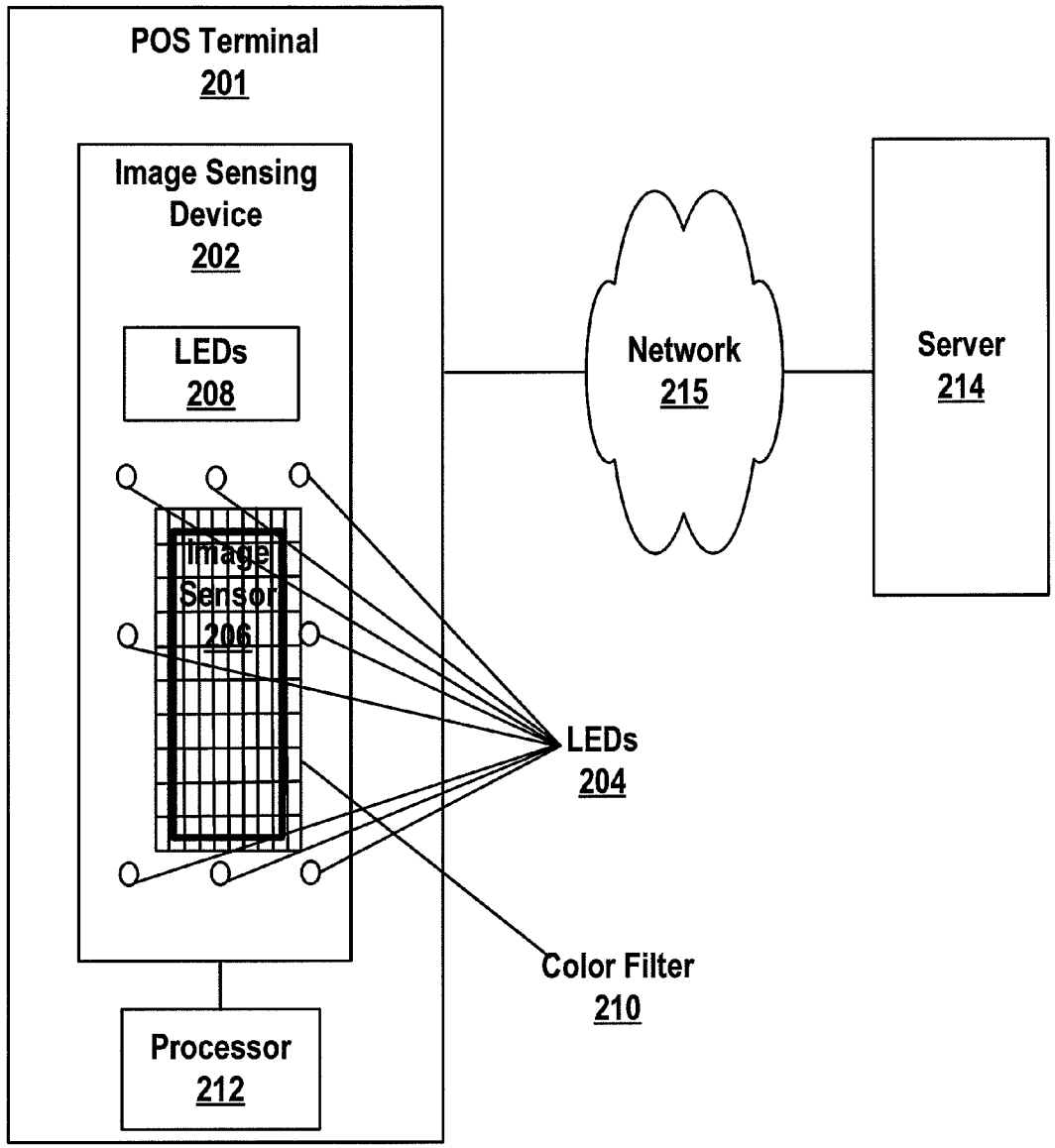
FIG. 2 is a block diagram that illustrates example components of an image processing system, according to an example embodiment of the present invention.

FIG. 2 is a block diagram that illustrates example components of an image processing system according to an example embodiment of the present invention. A data entry device, e.g. a Point of Sale (POS) terminal 201, may include an area-array image sensing device 202, e.g., a camera. The image sensing device 202 may include light sources, e.g., light emitting diodes (LEDs) 204, that emit light. Alternatively, the light sources may be positioned at other locations in the terminal 201. The emitted light, when reflected on the surface of a form, may form a pattern that indicates how the form, for example a lottery or gaming playslip, is to be positioned with respect to the image sensing device 202. For example, light emitted from the LEDs 204 may form a pattern in the shape of a square when projected onto a form. This may indicate to a user at the terminal 201 that a form is to be placed, for example, so that the edges of the form are aligned with the sides of the square, so that the form is within the square, such that each edge of the form is placed near a corresponding edge of the square, or so that the lines of the light-emitted square are placed within the form, each line close to a corresponding edge of the form. Alternatively, it may be predetermined that edges of a particular portion of the form are to be aligned with the sides of the square. Alternatively, the emitted light may form a pattern in the shape of, e.g., a single line that is to be positioned, e.g., in a box printed on the form. Any manner by which to indicate, with respect to the light-emitted pattern, a predetermined position in which to place the form may be implemented.

Figure 3:
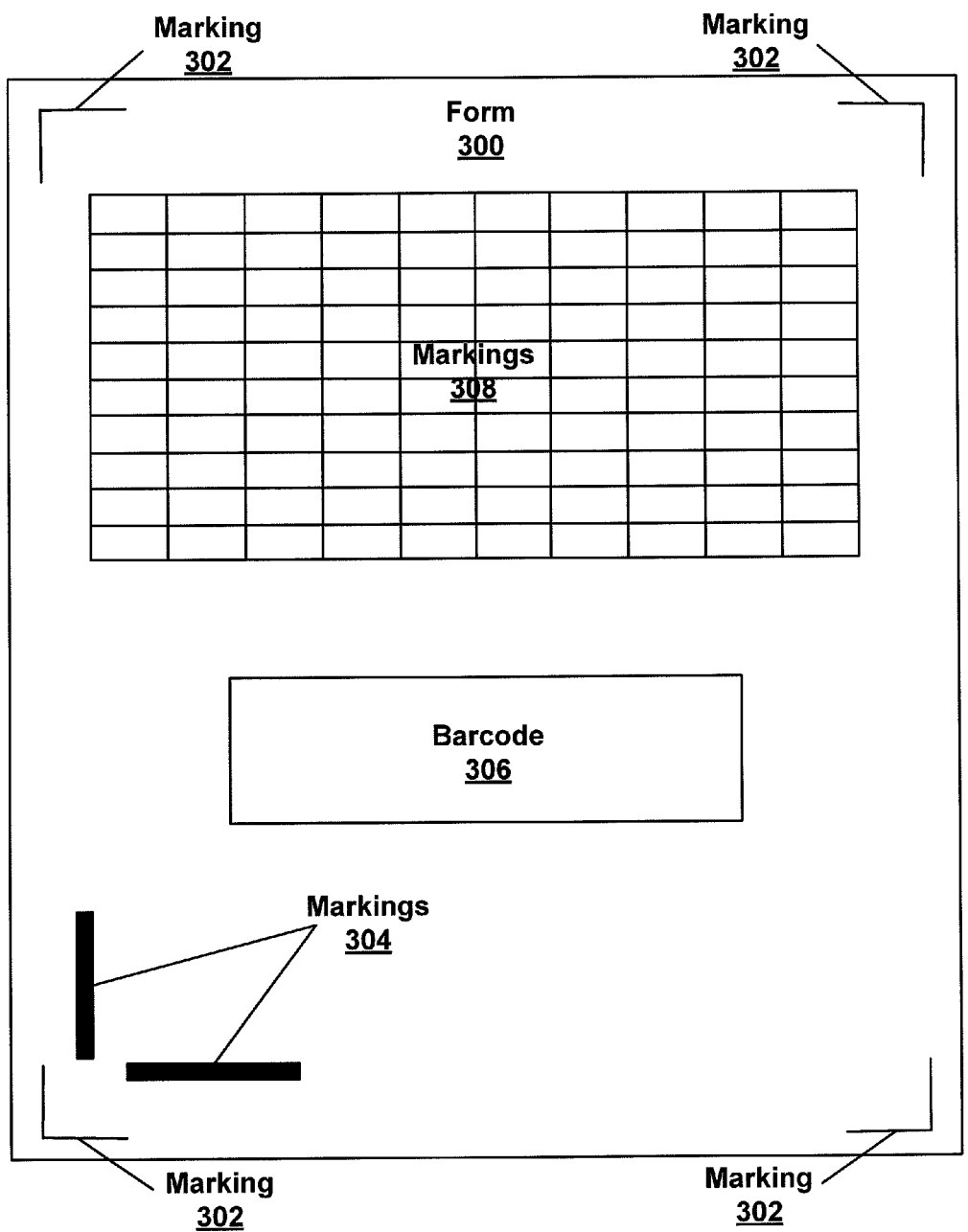
FIG. 3 illustrates an example form, according to an example embodiment of the present invention.

FIG. 3 illustrates an example form, e.g., a lottery playslip, an image of which is intended to be recorded by the image sensing device 202 of FIG. 2, according to an embodiment of the present invention. In one example embodiment of the present invention, a form 300 to be processed may include markings 302 that are to be aligned with the light-emitted pattern of the image recording device. For example, the form may include four small markings 302 that each includes two lines that form a right angle. These markings may outline a square, where the markings are each printed at a different corner of the outlined square. A user may align the markings with the corners of the light-emitted square pattern of the image sensing device 202 in order for the image sensing device 202 to sense an image of the form for correct processing of markings in the form. In an alternative embodiment, the form 200 may be correctly positioned when the markings 202 are positioned within the light-emitted square pattern and placed close to the edges of the pattern.

In an alternative example embodiment of the present invention, any predetermined light-emitted pattern may be used to indicate placement of a form to be processed with respect to the image recording device. For example, a circle, triangle, or even a single line may be used. For example, a form may include a narrow rectangular box, instead of the four markings 302. The image recording device may include lights that emit light in the form of a single line. A user may position the form so that the light-emitted line falls within the narrow rectangular box of the form. However, use of a light-emitted pattern that encompasses all four corners of the form may optimize minimization of the degree of the form's tilt during image sensing.

In an example embodiment of the present invention, the image sensing device 202 may sense an image of the entire surface of a form to be processed, e.g., form 300, simultaneously. Alternatively, where only a particular portion of the form 300 is to be processed, the image sensing device 202 may record an image of the entire surface of the particular portion of the form 300 simultaneously. Accordingly, the form 300 need not be moved with respect to the image sensing device 202 during the image recordation in order to continuously sense light reflected by sub-portions of the form 300. Both the image sensing device 202 and the form 300 may remain stationary, e.g., with respect one another, during image sensing.

For example, the image sensing device 202 may include an area-array image sensor 206, e.g., that includes an array of light sensitive diodes to simultaneously sense light reflected by the entire surface of the form 300. The image sensor 206 may convert the sensed light into electrical charges, and may convert the electrical charges into corresponding binary values that represent an image of the form 300 sensed by the image sensor 206. For example, the image sensor 206 may be a charge coupled device (CCD) or a complementary metal oxide semiconductor (CMOS). Example image sensing devices 202 may be the SX5000 from Symagery, the SI-1300 from Silicon Imaging, and the IBIS406600 from Fill Factory, all of which are CMOS imagers.

In an example embodiment of the present invention, a form 300 may be illuminated by ambient light. The form 300 may reflect the ambient light towards the image sensing device 202. The image sensor 206 of the image sensing device 202 may sense the reflected ambient light. The image sensing device 202 may sense an image of the form 300 based solely on the sensed reflected ambient light.

In an alternative example embodiment of the present invention, the image sensing device 202 may include lights, e.g., LEDs 208, to illuminate the form 300. For example, the LEDs 208 may supplement any ambient light that may be illuminating the form 300. According to this embodiment, the image sensing device 202 may sense an image of the form 300 even in an environment in which no ambient light illuminates the form 300.

In an example embodiment of the present invention, the image sensing device 202 may selectively sense particular portions of the form 300, such that the sensed image of the form 300 does not include particular markings of the form 300. For example, the form 300 may include markings that instruct a user, e.g., a player, how to complete the form, and that are not intended for processing. The image sensing device 202 may record an image of the form without these instruction markings.

According to this embodiment, the image sensing device 202 may sense an image of a form 300 excluding all markings of a particular color. Any markings of the form 300 not intended for processing may be printed in the particular color. For example, the image sensing device 202 may exclude from the sensed image any marking in the form 300 that is red. To exclude markings of a particular color from the sensed image, the image sensing device may include a color filter 210 that causes all markings of the particular color, e.g., red, to be sensed by the image sensor 206 as a blank area of the form.

In an example embodiment of the present invention, the terminal 201 may include a processor 212 to process markings in a sensed image of a form 300, e.g., binary values that represent the image. Alternatively, or in addition, a processor may be located at a location external to the terminal 201, e.g., at a server 214. According to this embodiment, the server 214 and the terminal 201 may be connected via a network 215. Any conventional network may be used. Accordingly, processing may be performed locally at the terminal 201 and/or at the server 214. For example, the types of processing performed at the server 214 may be that which relates to an overall system, e.g., a lottery system, while processing performed at the terminal 201 may be that which relates to the execution of individual transactions within the system. The image sensing device 202 may transmit towards the processor 212 the sensed image of the form 300. The processor 212 may process a marking within the image based on the location of the marking within the sensed image. For example, if a user filled in a circle located at an upper-left corner of a lottery playslip, the processor 212 may process a representation of the mark obtained from the image sensor 206 as an indication that a lottery player has chosen the number 1 as the first of a set of lottery numbers. The light emitted by the LEDs 204 may indicate to a user to place the playslip in a particular position with respect to the image sensing device 202 so that the circle representing the number 1 of the first of a set of lottery numbers will be located at the upper-left corner of the sensed image. The processor 212 may accordingly correctly process markings within the playslip.

According to an example embodiment of the present invention, the processor 212 may correctly process markings of the form 300 if the form 300 is placed with respect to the image sensing device 202 in any position that is within a range of proximally located predetermined positions. For example, the LEDs 204 may indicate to a user to place the playslip in a particular position with respect to the image recording device. The user may attempt to position the playslip in the indicated position but may mistakenly slightly shift and/or tilt the form from the indicated position. The processor 212 may be able to process markings of the form despite the shift or tilt, as long as the shift or tilt is not a very drastic shift or tilt by which the playslip is positioned out of a predetermined range of positions.

The LEDs 204 may indicate an optimum position into which the user is to place the playslip. The processor 212 may be configured to recognize the markings of the playslip even if the top of the playslip is tilted forward or backward, e.g., up to 200 relative to the axis that is perpendicular to the playslip when positioned in the optimum position. For example, the processor 212 may be configured to recognize the tilt and correct the image before processing the markings so that the processor 212 may process markings of the image of the playslip as though the playslip was placed at the optimum position. Alternatively, the processor 212 may be configured to correctly process markings of an image of a playslip even without correcting a misplaced form 300. For example, the form 300 may include markings that may be positioned at a predetermined distance from one another, such that when the form 300 is placed within any of a range of positions, each marking of the form 300 may always fall within a single corresponding predetermined area. The processor 212 may accordingly process the markings of the form 300 if the form 300 is placed within any of the predetermined range of positions. In a further alternative example embodiment, the processor 212 may convert the image to grayscale. The processor 212 may then determine the extent of the shift or tilt angle. According to the determined position, the processor 212 may process the markings. For example, for each position within a predetermined range of positions, the processor 212 may process the image in a different manner.

In an example embodiment of the present invention, the processor 212 may be able to correctly process markings of an image of a form if the form is placed in a position that is within a distance range of six to eight inches from the image sensing device 202.

According to an example embodiment of the present invention, the processor 212 may be configured for optical character recognition (OCR), and may process alpha-numeric characters, whether machine-printed or hand-printed, that are within a form 300, e.g., a sensed image of the form 300. For example, a lottery playslip may include a series of blank lines above which a player may print selected numbers for a lottery drawing. The selected numbers may vary from playslip to playslip. The processor 212 may process the printed numbers of the image of the playslip sensed by the image sensing device 202.

In an example embodiment of the present invention, the light-emitted pattern of the image sensing device 202 may indicate for the form 300 a predetermined placement position with respect to the abscissa position of the form 300, the ordinate position of the form 300, the distance of the form 300 from the image sensing device 202, and/or the orientation of the form 300. For example, if a playslip is positioned 12" from the image sensing device 202, a light-emitted square pattern of the image sensing device 202 may form towards the center of the playslip. For the pattern to properly form for example at the edges of the playslip, it may be required to move the playslip closer to the image sensing device 202.

In an example embodiment of the present invention, a predetermined position with respect to the rotational orientation of a form 300 to be processed may not be required. According to this embodiment, an orientation of a sensed image may be predetermined. The processor 212 may be configured to rotate a sensed image of the form 300 to the predetermined orientation. The processor 212 may then process the rotated image.

According to this embodiment, a form 300 may include markings 304 that indicate to the processor 212 a manner in which to rotate the recorded image. For example, the form 300 may include markings 304 along two sides, e.g., adjacent edges, of the form 300. The processor may be configured to rotate a recorded image of the form until the two markings are located at a predetermined position, e.g., one marking 304 at a lower portion of a left side of the image, and the other marking 304 at a left portion of a bottom side of the image.

Figure 4:
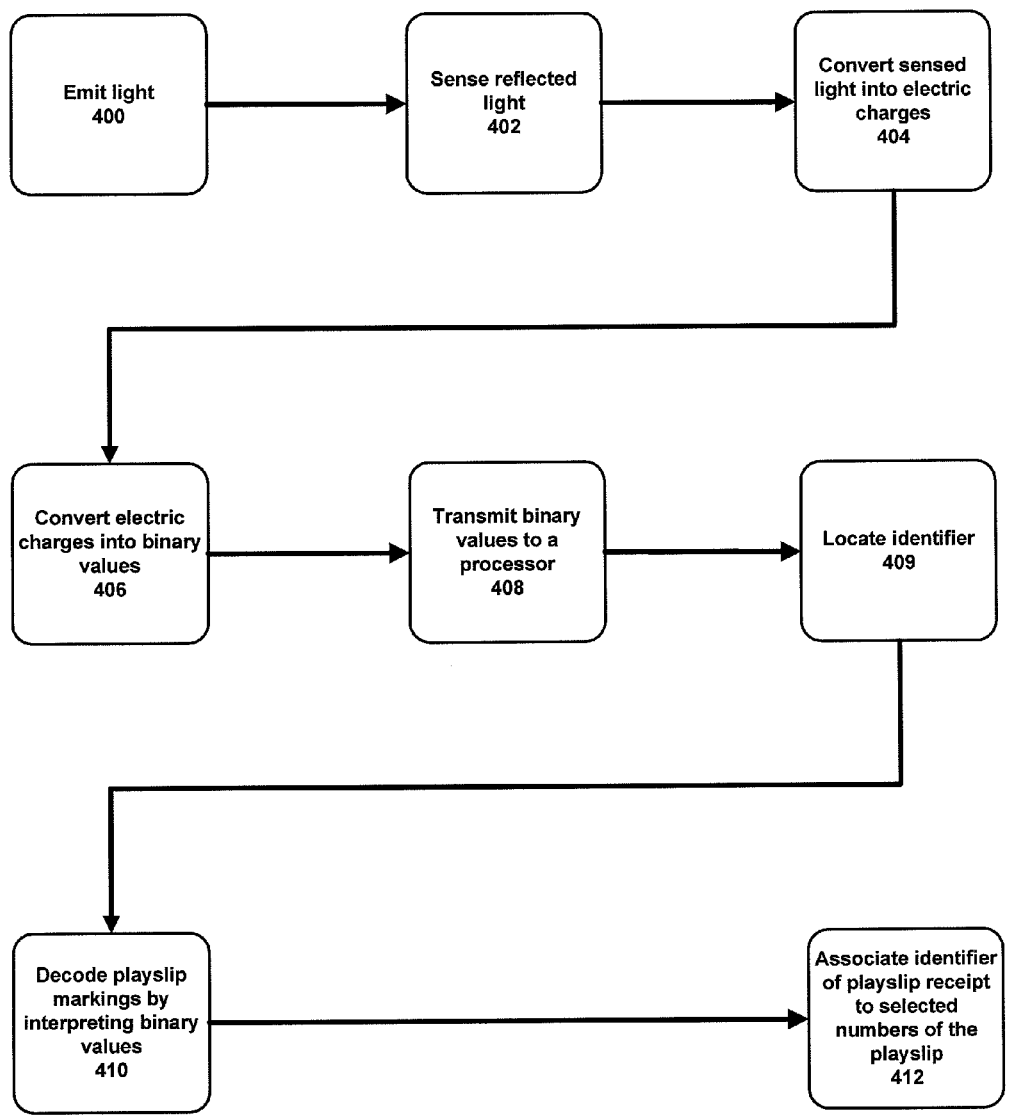
FIG. 4 is a flowchart that illustrates an example procedure in which a lottery playslip may be processed, according to an example embodiment of the present invention.

FIG. 4 is a flowchart that illustrates an example procedure in which a lottery playslip is processed, according to an example embodiment of the present invention. In step 400, LEDs of an image recording device may emit light to form a pattern according to which a lottery playslip is positioned with respect to the image recording device. The lottery playslip, or at least a portion of the lottery playslip that is to be processed, may have known dimensions. The LEDs of the image recording device may be tailored to the known dimensions of the lottery playslip, in order to emit light, in step 400, so as to aid in the placement of the playslip that has the known dimensions.

The image recording device may rely solely on ambient light to illuminate the lottery playslip. Alternatively, in step 400, LEDs may be provided to emit light to supplement ambient light in illuminating the lottery playslip.

In step 402, an image sensor, e.g. an area-array sensor, such as a CCD or CMOS image sensor, or any conventional area-array image sensor, may sense light reflected by a lottery playslip positioned with respect to the image sensing device according to the light-emitted pattern formed by the LEDs in step 400.

The playslip may include instructions to a lottery player. It may not be required for the instructions portion of the lottery playslip to be processed, since the instructions may be intended only to convey information to the lottery player. These instructions may include instructions with respect to how to fill out the playslip, how to claim prize money, rules of the lottery game, and any instructions conventionally printed on a lottery playslip. The included instructions may be printed on the lottery playslip in red. A color may be provided in order to exclude the red instruction markings of the lottery playslip during sensing of an image of the lottery playslip.

In step 404, the image sensing device may convert the sensed light into electrical charges. In step 406, the image sensing device may convert the electrical charges into binary values. The binary values may represent an image of the lottery playslip. The represented image may exclude red instruction markings of the lottery playslip. In step 408, the image sensing device may transmit the binary values to a processor. The processor may be located in a lottery POS terminal. Alternatively, the processor may be located at an external location, for example, at a central lottery processing location, connected to the POS terminal, e.g., via a network. In an alternative embodiment, the processor may be integrated in the image sensing device. In one embodiment, a plurality of processors may be provided. The various processes to be performed may be divided amongst the plurality of processors. According to this embodiment, a processor may be located in the image recording device, at a location that is external to the image recording device and within the POS terminal, and at a location external to the POS terminal.

In step 410, the processor may decode playslip markings. The processor may interpret the transmitted binary values as an image of the lottery playslip. The processor may interpret individual markings of the represented image. For example, the processor may determine from markings within the playslip the type of lottery game played with the lottery playslip, and may determine player selected numbers for the lottery game, e.g., for a future lottery drawing, a time of the entry, a date of a particular drawing, a bet amount, etc.

In an example embodiment of the present invention, after the processor processes the markings, the processor may transmit a message to a user that indicates the information the processor determined from the markings. In response, the user may indicate to the processor whether the processor correctly processed the markings. For example, the processor may display in a window within a display area of a graphical user interface. The processor may include the message and two buttons in the window. The user may click one button to indicate that the processor correctly processed the markings and may click the other button to indicate that the processor incorrectly processed the markings. If the user indicates that the markings were correctly processed, the processor may record the entry. Otherwise, the processor may return to 410 and process the markings again. Alternatively, the processor may indicate to the user that the playslip is to be input a second time. This procedure may be repeated until the user indicates that the processor has correctly processed the playslip markings.

The processor may output a receipt associated with the information obtained from the markings of the playslip. For example, in step 412, the processor may associate the player selected numbers with a particular barcode or other identifier. The barcode may be printed on the receipt. The receipt may be printed at the time of playslip purchase. For example, the barcode may be printed at the time of playslip purchase. Alternatively, the barcode may be pre-printed on a receipt portion of the lottery playslip. According to this alternative, the image sensing device may sense an image of both the number selection portion of a lottery playslip and the receipt portion of the lottery playslip. A lottery player may remove the receipt portion of the lottery playslip after the image of the playslip is sensed. In step 412, the processor may associate the player selected numbers to the barcode of the playslip receipt. If the playslip does not include a receipt portion, the processor may additionally, in step 412, generate a unique barcode to be associated with the player selected numbers of the lottery playslip. After processing of the playslip, the generated barcode may be printed on a receipt. The processor may store, e.g., in a central database, an identification of the barcode and its association with the player selected numbers.

After a drawing associated with the playslip, the lottery player may present the receipt. The processor may access the central database to ascertain whether the lottery player is a lottery drawing winner.

In an example embodiment of the present invention, a processor 212 of FIG. 2 may process markings of a sensed image of a form 300 of FIG. 3 even where the form 300 is not precisely positioned according to a predetermined position during image sensing. According to this embodiment, the form 300 may be provided with at least one identifier, e.g., a barcode 306, the features of which are readily distinguishable by the processor 212 from other surrounding markings, e.g., instruction markings, white space, and markings 308. The processor 212 may accordingly recognize the barcode 306 from within the recorded image. The barcode 306 may be a receipt barcode or may be a barcode used only to process markings of the form 300.

In one example embodiment of the present invention, the barcode 306 may indicate to the processor 212 a way in which to process other markings 308 within the form. See, e.g., "Method and Apparatus for Providing and Processing Active Barcodes," Thomas K. Oram, U.S. patent application Ser. No. 10/698,152. For example, the barcode 306 may indicate that the processor 212 is to process a marking 308 positioned five inches above and a half an inch to the left of the barcode 306 as the number 1 and as the first position of a set of selected numbers for a lottery drawing. The processor 212 may process the barcode 306 and subsequently process markings 308 within the image in accordance with the processed data of the barcode 306. Alternatively, the barcode 306 may indicate, with respect to the position of the barcode 306, positions within the sensed image of particular edges of the form. The processor 212 may accordingly ascertain the positions of each coordinate along the entire surface of the form 300 with respect to the sensed image. The barcode 306 may also indicate to the processor 212 how to process markings at various positions with respect to the ascertained representation of the form surface. Alternatively, the processor 212 may be configured to process a marking according to the marking's position with respect to the ascertained representation of the form surface without further instructions of the barcode 306.

In an alternative example embodiment of the present invention, the barcode 306 may omit processing instructions. According to this embodiment, the processor 212 may locate and recognize the barcode 306 from within the image, and may process markings 308 within the sensed image based on the position of the markings 308 with respect to the barcode 306.

According to an example embodiment of the present invention, an image sensing device may be provided that may sense an image of markings that are as narrow as one-hundredth of an inch. According to this embodiment, the barcode 306 may include a bar as narrow as one-hundredth of an inch.

According to the embodiment in which a form includes an identifier, such as a barcode, to aid in the processing of form markings, in step 400 of FIG. 4, provision of a light-emitted pattern according to which the lottery playslip is positioned may be omitted. Instead, in step 409, the processor may locate the barcode that aids in the processing of markings. In step 410, the processor may decode the playslip markings according to the barcode located in step 409, e.g., according to a position of the markings with respect to the barcode, as discussed above.

In one example embodiment, the processor may process markings of a number of different types of forms. For example, different forms may be used for different lottery games. Different barcodes may be included for the different form types. The processor may determine how to process markings based on the particular barcode included in the form. For example, before proceeding to 410, the processor may identify the barcode included in the form.

Those skilled in the art can appreciate from the foregoing description that the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for processing entry markings of a form having at least one alignment marking and a plurality of entry markings, comprising;
    capturing an image of the form with an area-array image sensor when the form is within a predetermined range of positions in free-space relative to the sensor without requiring relative movement of the sensor and the form; and
    interpreting the image of the form, with a processor, to determine a first entry selection based at least in part on the position of a first entry marking with respect to the at least one alignment marking in the image.

2. The method of claim 1, further comprising;
    interpreting the image of the form, with a processor, to determine a second entry selection based at least in part on the position of a second entry marking with respect to the first entry marking in the image.

3. The method of claim 1, wherein the plurality of entry markings on the form indicates a set of numbers for a lottery drawing.

4. The method of claim 1, wherein the at least one alignment marking is printed on the form and the plurality of entry markings are handwritten on the form.

5. The method of claim 1, wherein:
    the predetermined range of positions includes an optimal position; and
    the processor is configured to determine a difference between an actual placement position of the form within the predetermined range of positions when the image was captured and the optimal position, and to interpret the image to decode the entry markings based, at least in part, on the determined difference.

6. The method of claim 1, further comprising:
    transmitting a message indicating the first entry selection determined from the first entry marking.

7. The method of claim 1, further comprising:
    generating a receipt indicating the first entry selection determined from the first entry marking.

8. An article of manufacture comprising a computer-readable medium having stored thereon instructions adapted to be executed by a processor, the instructions which, when executed, define a series of steps to be used to control a method for processing a lottery playslip, the method comprising:
    capturing, with an area-array image sensor, an image of the playslip in free-space without requiring relative movement of the sensor and the playslip, wherein the playslip comprises at least one form marking and a plurality of playslip markings; and
    interpreting the image of the playslip, with a processor, to determine at least a first entry selection based on the position of a first playslip marking with respect to the at least one form marking in the image.

9. The article of claim 8, further having stored thereon instructions adapted to be executed by a processor, the instructions which, when executed, further comprise the step of:
    interpreting the image of the playslip, with a processor, to determine a second entry selection based at least in part on the position of a second playslip marking with respect to the first playslip marking in the image.

10. The article of claim 8, further having stored thereon instructions adapted to be executed by a processor, the instructions which, when executed, further comprise the step of:
    transmitting a message indicating the entry selections determined from the plurality of playslip markings in the image.

11. The article of claim 8, wherein at least one of the plurality of playslip markings in the image of the playslip is interpreted to determine entry numbers for a lottery drawing.

12. The article of claim 8, further having stored thereon instructions adapted to be executed by a processor, the instructions which, when executed, further comprise the step of:
    generating a receipt indicating the entry selections determined from the plurality of playslip markings in the image.

13. The article of claim 8, wherein the entry numbers are indicated in the playslip image by the positions of the plurality of playslip markings that are handwritten on the playslip.

14. A method for facilitating play of a game, comprising:
    sensing an entry form having entry markings and at least one alignment marking in free space;
    capturing a digital image of the entry form with an area-array image sensor when the at least one alignment marking is within a predetermined range of positions in free-space relative to the area-array image sensor, without requiring relative movement of the area-array image sensor and the entry form; and
    interpreting the digital image, with a processor, to decode the entry markings on the entry form based, at least in part, on the positions of the entry markings with respect to the at least one alignment marking in the digital image.

15. The method of claim 14, wherein the entry markings are decoded to determine player game entries.

16. The method of claim 14, wherein the entry markings are handwritten.

17. The method of claim 14, wherein the-entry markings indicate a set of numbers for a lottery drawing.

18. The method of claim 14, wherein the entry markings are decoded in accordance with their relative positions within the image of the entry form.

19. The method of claim 14, further comprising:
    emitting a pattern of light that indicates a predetermined range of positions with respect to the area-array image sensor for placement of the entry form in free space.

20. The method of claim 14, wherein:
    the predetermined range of positions includes an optimal position; and
    the processor is configured to determine a difference between an actual placement position of the form within the predetermined range of positions when the image was captured and the optimal position, and to interpret the digital image to decode the entry markings based, at least in part, on the determined difference.

21. The method of claim 14, further comprising:
transmitting a message indicating the player game entries determined from the entry markings on the entry form.

22. The method of claim 14, further comprising:
generating a receipt indicating the player game entries determined from the entry markings on the entry form.

23. A method for processing form markings, comprising:
emitting light that when reflected on the surface of a form forms a pattern that indicates an optimal position, within a predetermined range of positions in five space for placement of the form with respect to an image sensor;
capturing an image of the form with the area-array image sensor, when the form is within the predetermined range of positions in free-space, without requiring relative movement of the area array image sensor and the form;
determining a difference between an actual placement position of the form when the image was captured and the optimal position;
interpreting the image of the form based on the determined difference, and
decoding at least one marking in the image based on a position of the at least one marking in the interpreted image.

24. The method of claim 23 wherein emitting light further comprises emitting light with a light emitting diode.

25. The method of claim 23 wherein:
determining a difference between an actual placement position of the form when the image was captured and the optimal position further comprises identifying a first alignment mark in a vicinity of a first edge of the form in the image and a second alignment mark in a vicinity of a second edge of the thrm in the image; and
interpreting the image of the form based on the determined difference further comprises rotating the form to an orientation of the optimal position based on the first and second alignment marks.

26. The method of claim 23 wherein capturing an image of the form with the area-array image sensor further comprises simultaneously capturing an image of an entire surface of the form.

27. The method of claim 23 wherein decoding at least one marking in the image based on a position of the at least one marking in the interpreted image further comprises decoding the at least one marking as at least one selection for a set of numbers for a lottery drawing entry.

\* \* \* \* \*

UNITED STATES PATENT AND TRADEMARK OFFICE
CERTIFICATE OF CORRECTION

PATENT NO. : 8,233,181 B2
APPLICATION NO. : 13/026712
DATED : July 31, 2012
INVENTOR(S) : John Abraitis It is certified that error appears in the above-identified patent and that said Letters Patent is hereby corrected as shown below:

Column 11, line 12, claim 23, "five" should be changed to --free--

Column 12, line 9, claim 25, "thrm" should be changed to --form--

Signed and Sealed this
Ninth Day of October, 2012

David J. Kappos
*Director of the United States Patent and Trademark Office*